United States Patent Office 2,973,934
Patented Mar. 7, 1961

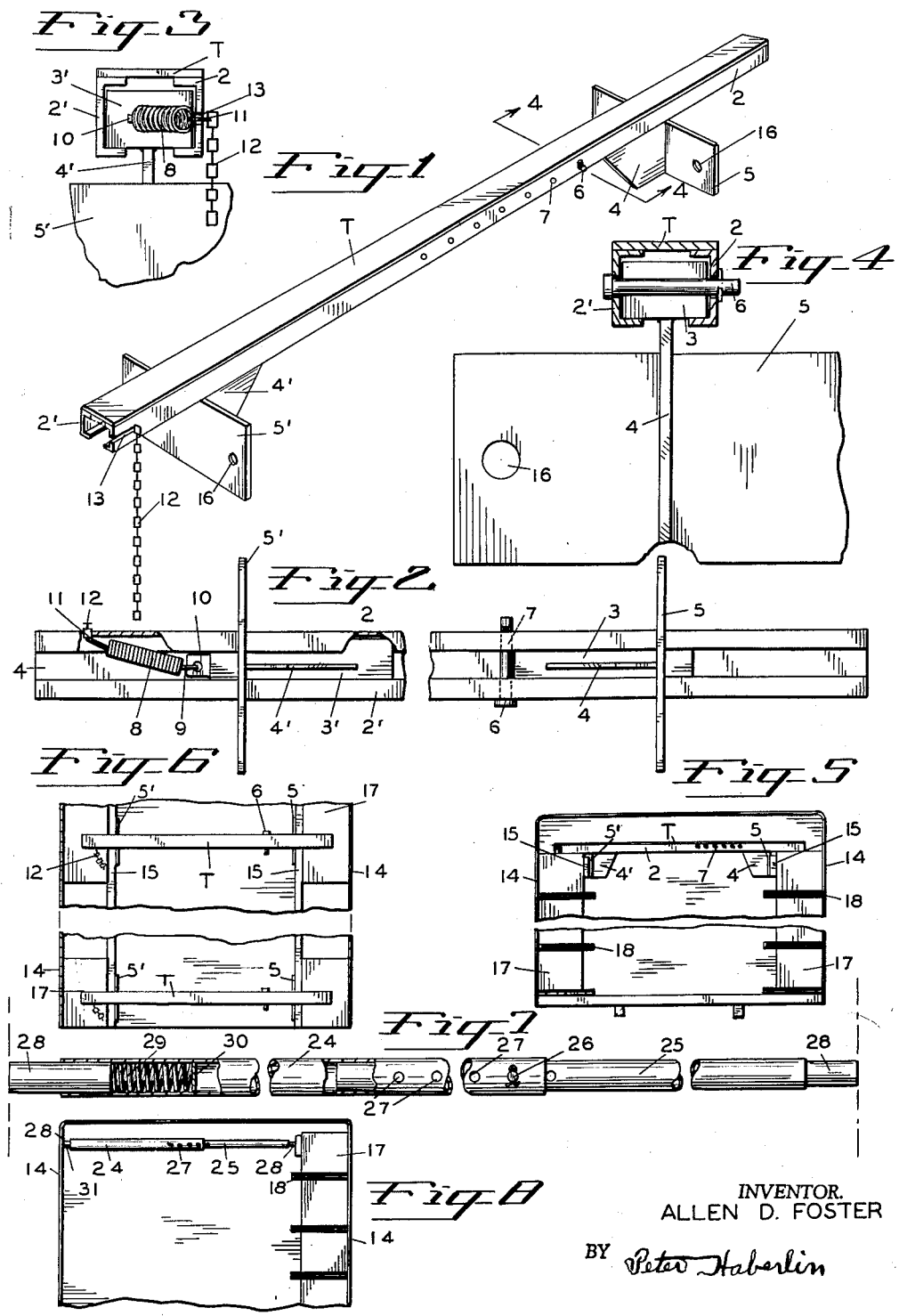

2,973,934
STABILIZER FOR BRACING LOADS
Allen D. Foster, 7104 N. Central, Portland, Oreg.
Filed June 9, 1958, Ser. No. 740,689
1 Claim. (Cl. 248—356)

This invention relates to stabilizers for loads being transported on trucks, but more particularly to structures of this kind that provide bracing devices for the prevention of shifting of stacked material during transit.

When operating this structure, the materials to be transported are stacked on pallets and subsequently stacked into a truck by means of hoisting equipment, then lowered into the truck along either side thereof and the stabilizers so arranged between the stacks that the load is always held in its original location in the truck, and by adjusting the various elements that comprise the stabilizer, the load is prevented from any sidewise shifting during transit.

One object of the disclosed embodiment of this invention is to provide an improved means to facilitate the loading and unloading of trucks; and further:

To provide channel bars which rest atop the articles loaded on a truck with slidable members which separate said articles for the purpose of holding said articles in fixed lateral position until removed at the will of the operator.

Other objects and advantages will become apparent in the following specification and appended claims, which taken in connection with the accompanying drawings form part of this application, of which:

Fig. 1 is a perspective view of a preferred form of an embodiment of the invention;

Fig. 2 is an inverted plan view of Fig. 1, partly broken away for convenience of illustration;

Fig. 3 is a fragmentary end view looking from the right of Fig. 1;

Fig. 4 is a sectional view taken on line 4—4 of Fig. 1;

Fig. 5 is an end view of a truck body partly broken away and showing the stabilizer applied to a load;

Fig. 6 is a top plan view of Fig. 5;

Fig. 7 is an alternative form of stabilizer construction; and

Fig. 8 is a plan view of Fig. 7 showing its application to a truck cargo.

Now with more detailed reference to the drawing, in which like numerals of reference indicate like parts, the numeral 2—2' indicates channel bars separated by top T which is welded to said channel bars as shown in Figs. 1 and 3 for the purpose of holding them in parallel relation, while guides 3—3' are longitudinally movable in said channel bars and welded to gusset plates 4—4' which are welded to spreaders 5—5' forming two integrally slidable units designed to function as will hereinafter be more fully set forth in detail.

The end of guide 3 remote from the cargo abuts pin 6 which is located relative to channel bars 2—2' by means of apertures 7 defined in said channel bars and holds spreader 5 in lateral contact with one side of the cargo while its opposite side is pressed against the inner surface of the side of a truck. Spreader 5' separates the cargo and urges it against the other side of the truck by the aid of a helical spring 8, having a hook 9 formed at one end thereof and passing through eye 10 of guide 3' (as best shown in Fig. 2) while the opposite end of said spring terminates in loop 11, to which is attached one end of chain 12, while the free end of said chain is adapted to be used as means to stretch spring 8 and bring spreader 5' into contact with one side of the separated cargo, then locking said chain into slot 13 formed at the left hand end of Fig. 1.

Figs. 5 and 6 illustrate the means of stacking a cargo into truck body 14 by first attaching boards 15 to spreaders 5—5' by means of screws which pass through holes 16 formed in said spreaders which pass longitudinally of cargo 17, contacting the upper tier thereof, while each tier rests on a pallet 18 as shown in Fig. 5. When a cargo is so stacked the weight of the stabilizer combined with the pressure of the spreaders keep the separate portions of the cargo in longitudinal and lateral alinement during transit.

Figs. 7 and 8 illustrate an alternate form of structure consisting of telescopic tubular members 24 and 25 having holes 27 drilled therethrough at predetermined places to receive locking pin 26. The member 25 has its outer diameter approximately equal to the inner diameter of tube 24 while plungers 28 are located in each end of said tubular members bearing against springs 29 and bulkheads 30 which are affixed within the tubular members and function in the same manner as the first described stabilizer.

These stabilizers could be arranged to hold a cargo either longitudinally or laterally of a truck, while the channel bars and tubular members support longitudinally movable units which contact a cargo.

While this invention has been described in detail and with specific illustrations, it is understood that other modifications in construction and arrangements of parts may be devised without departing from the spirit and scope of the invention. The present embodiment is illustrative but not restrictive, since the scope and purview of the invention is indicated by the appended claim rather than by the foregoing description.

Having thus fully illustrated and described an embodiment of the invention and a method of producing the same, in a manner that may enable others skilled in the art to which it appertains to construct and use the same, what is claimed and desired to be secured by Letters Patent is:

A stabilizer for bracing loads during transportation, comprising pallets on which loads are stacked and placed in truck bodies, channel bars adapted to rest atop a truck load, means to connect said channel bars in longitudinal parallel alinement, guides longitudinally movable in said channel bars, gusset plates welded to said guides, spreaders rectangularly affixed to said gusset plates to contact one lateral surface of a truck load, a manually operable pin passing through each channel bar and one of said guides to lock one of the spreaders in contact with a truck load, a spring attached to one end of one of said guides in each channel bar, a chain attached to the spring remote from said last mentioned guide to manually tense said spring bringing said spreader into registration with one lateral surface of a truck load, thus causing the opposite spreader to force a load against a truck body, and means defined adjacent one end of each channel bar to lock said chain in a predetermined position to prevent lateral shifting of a load during transit.

References Cited in the file of this patent

UNITED STATES PATENTS

| | | |
|---|---|---|
| 466,940 | Fowler | Jan. 12, 1892 |
| 545,918 | Smith | Sept. 10, 1895 |
| 1,229,976 | Klais | June 12, 1917 |
| 1,372,180 | McFadden | Mar. 22, 1921 |
| 1,548,053 | Mead | Aug. 4, 1925 |
| 2,298,851 | Wachter | Oct. 13, 1942 |
| 2,440,437 | Fahland | Apr. 27, 1948 |
| 2,806,436 | Johnston | Sept. 17, 1957 |